Sept. 13, 1932.  H. C. EINSTEIN  1,876,647

SORTING MACHINE

Original Filed July 17, 1922    7 Sheets-Sheet 2

INVENTOR.
Howard C. Einstein
BY
Fay, Oberlin & Fay
ATTORNEYS

Sept. 13, 1932.  H. C. EINSTEIN  1,876,647

SORTING MACHINE

Original Filed July 17, 1922  7 Sheets-Sheet 3

INVENTOR.
Howard C. Einstein
BY
Fay, Oberlin & Fay
ATTORNEYS

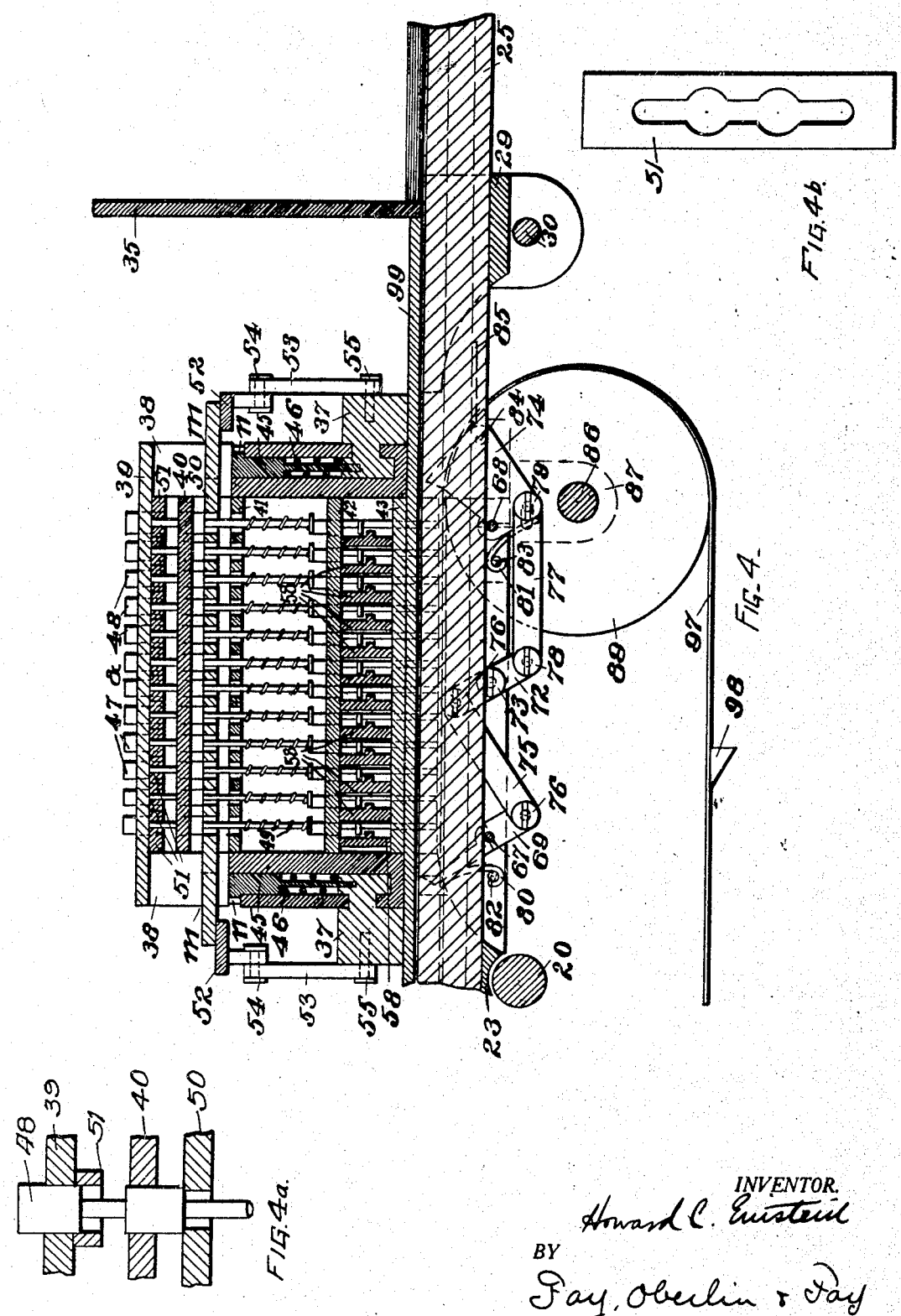

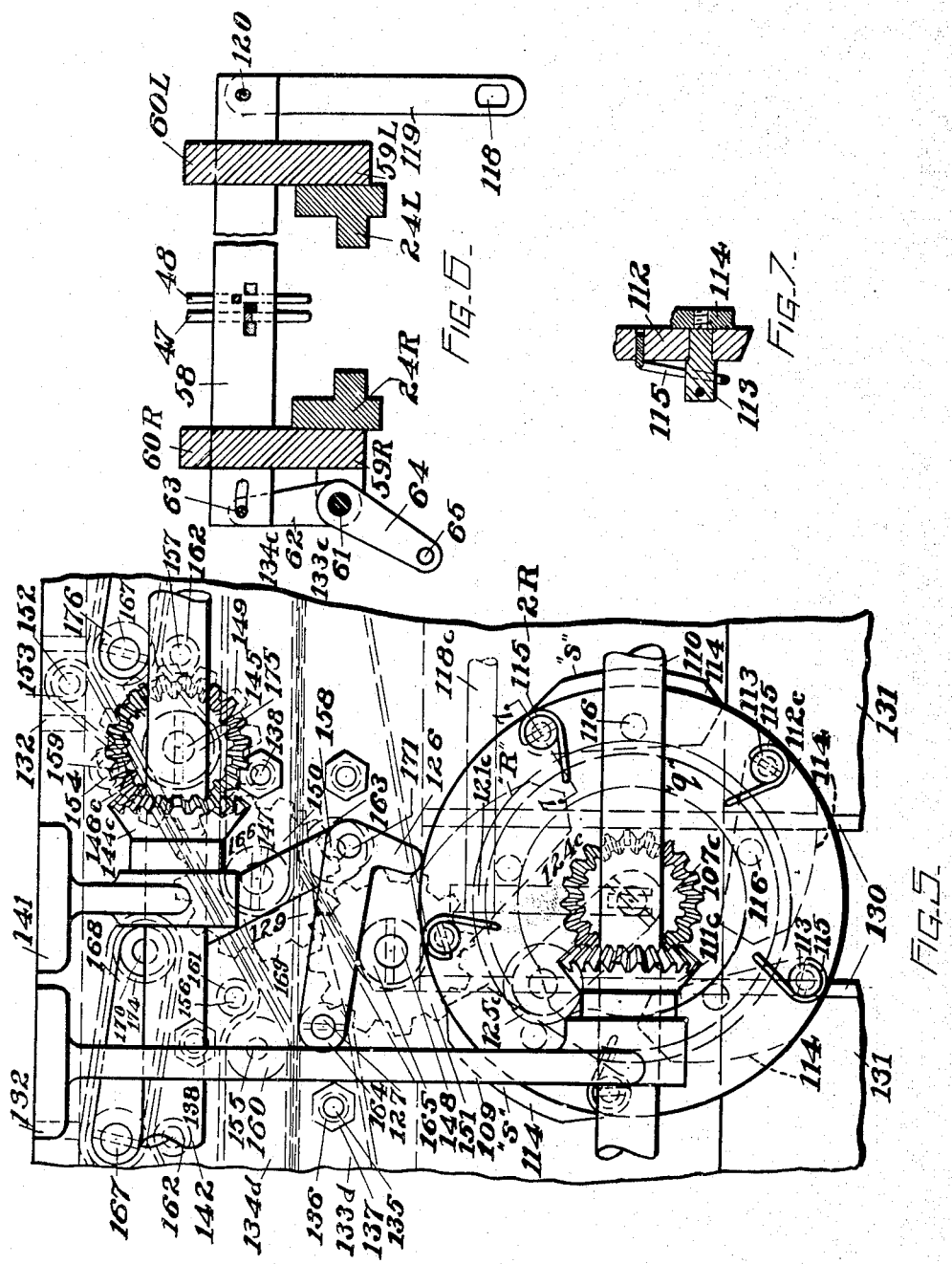

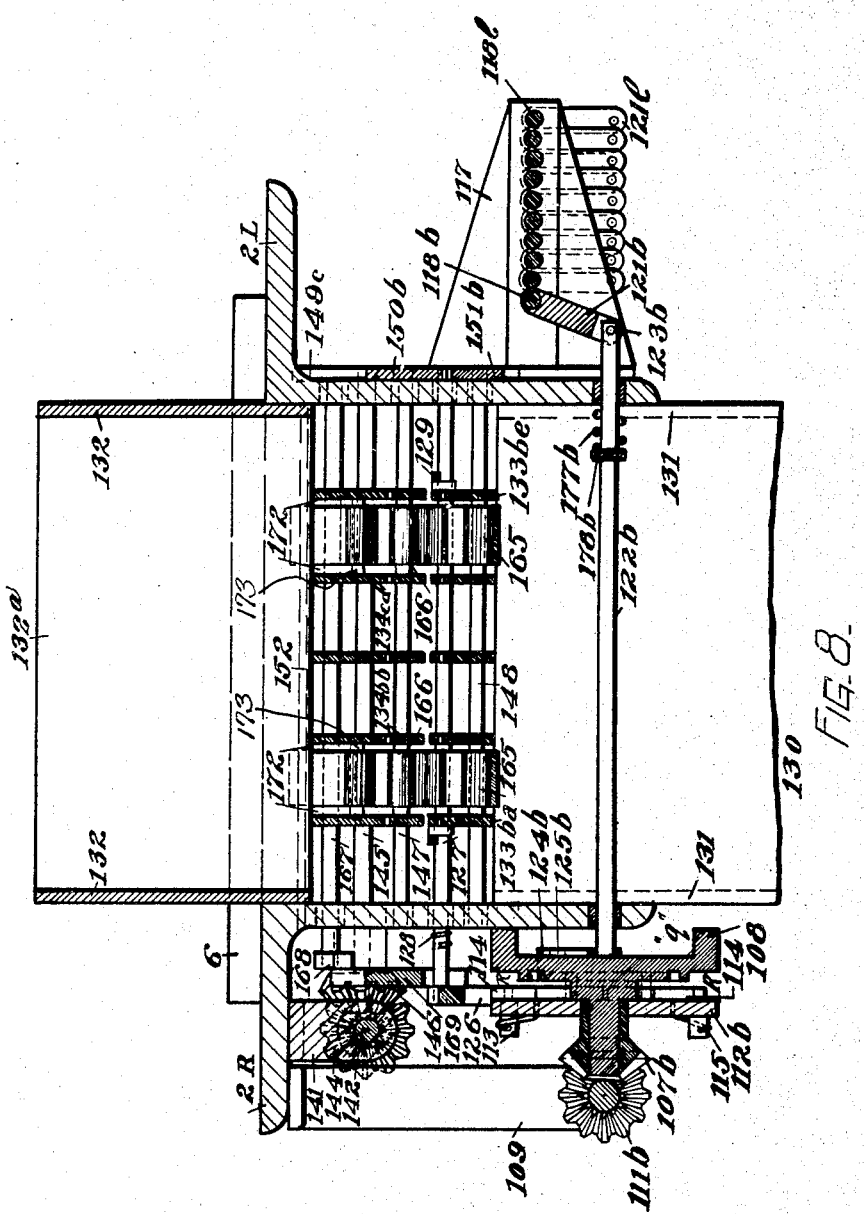

Sept. 13, 1932.  H. C. EINSTEIN  1,876,647
SORTING MACHINE
Original Filed July 17, 1922   7 Sheets-Sheet 7
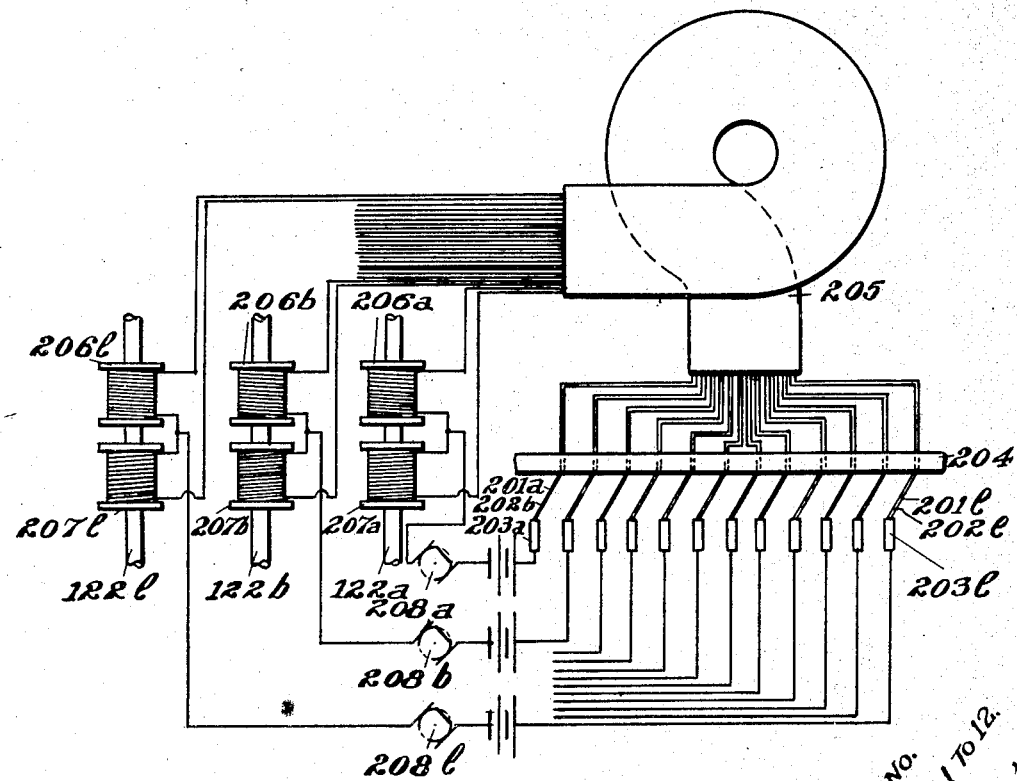
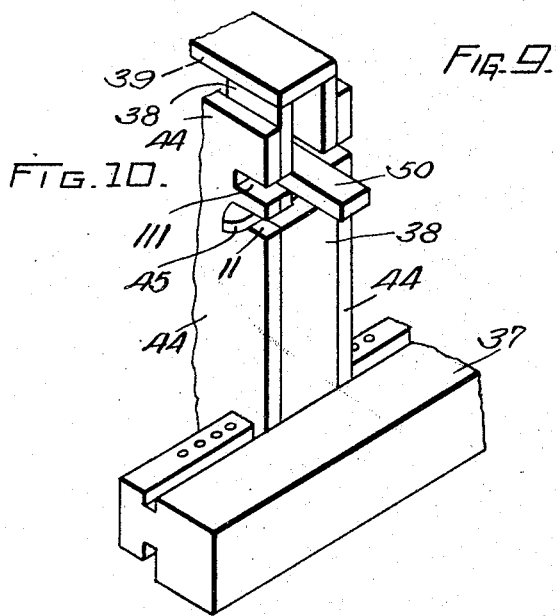
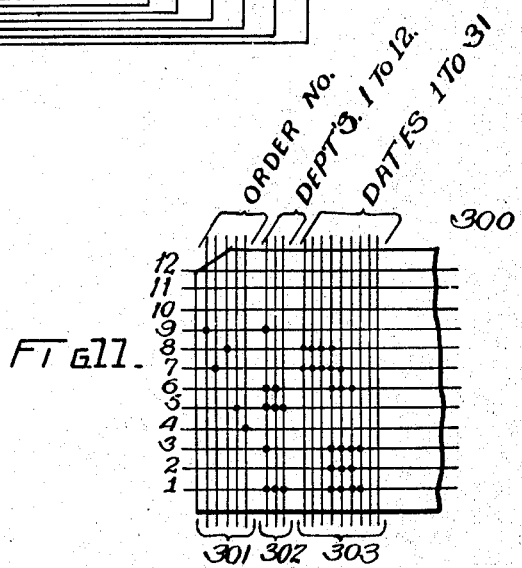
INVENTOR.
Howard C. Einstein
BY
Fay, Oberlin & Fay
ATTORNEYS.

Patented Sept. 13, 1932

1,876,647

UNITED STATES PATENT OFFICE

HOWARD C. EINSTEIN, OF DETROIT, MICHIGAN, ASSIGNOR TO THE TABULATING MACHINE COMPANY, OF NEW YORK, N. Y., A CORPORATION OF NEW JERSEY

SORTING MACHINE

Original application filed July 17, 1922, Serial No. 575,468. Divided and this application filed January 28, 1929. Serial No. 335,411.

This application is a division of my copending application for "sorting machines", Serial No. 575,468, filed July 17, 1922.

The present improvements, relating, as indicated, to sorting machines, are more particularly directed to the provision of certain improvements in such machinery which admit of an increased usefulness, flexibility and range of application of this type of apparatus. More particularly the invention is directed to means for cancelling any entry on a card by means of a second entry, such entries consisting of punched holes as in previous card sorting processes. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
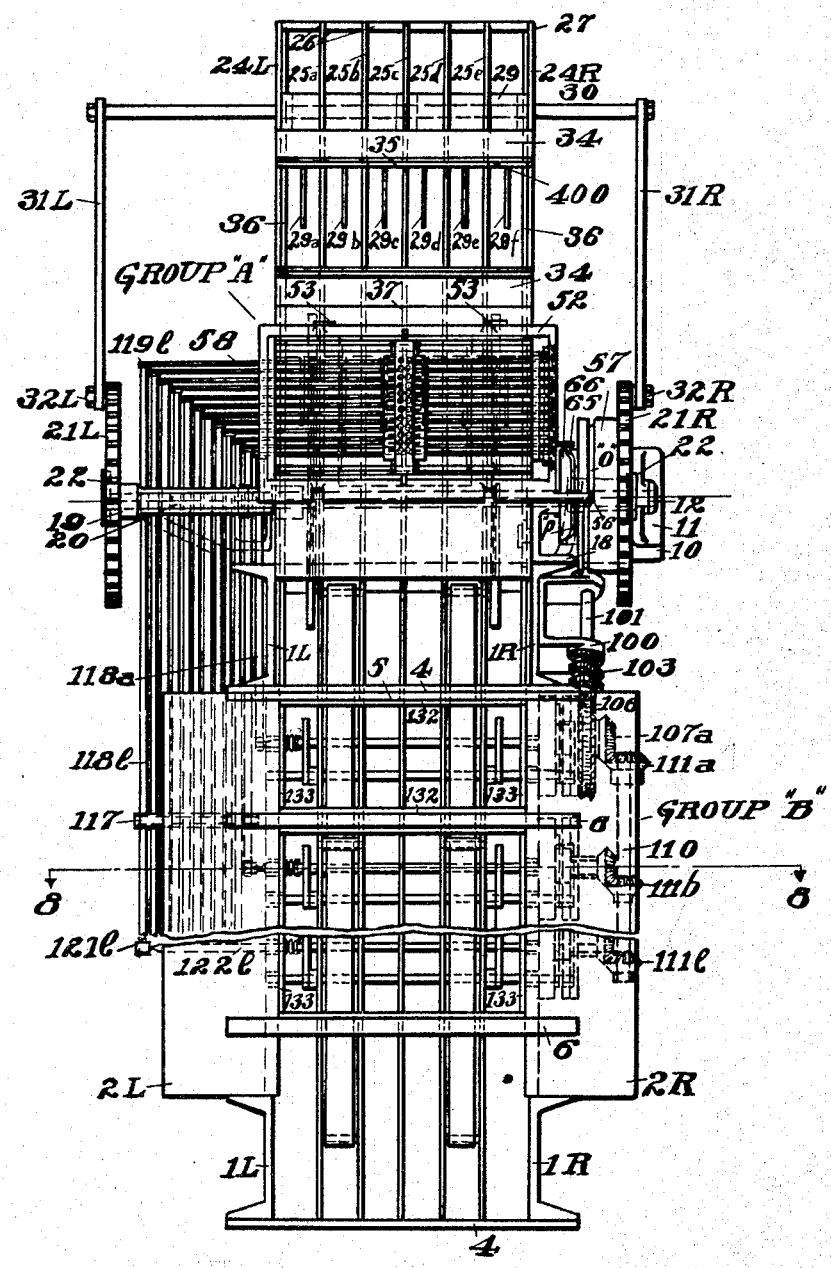
Figure 2:
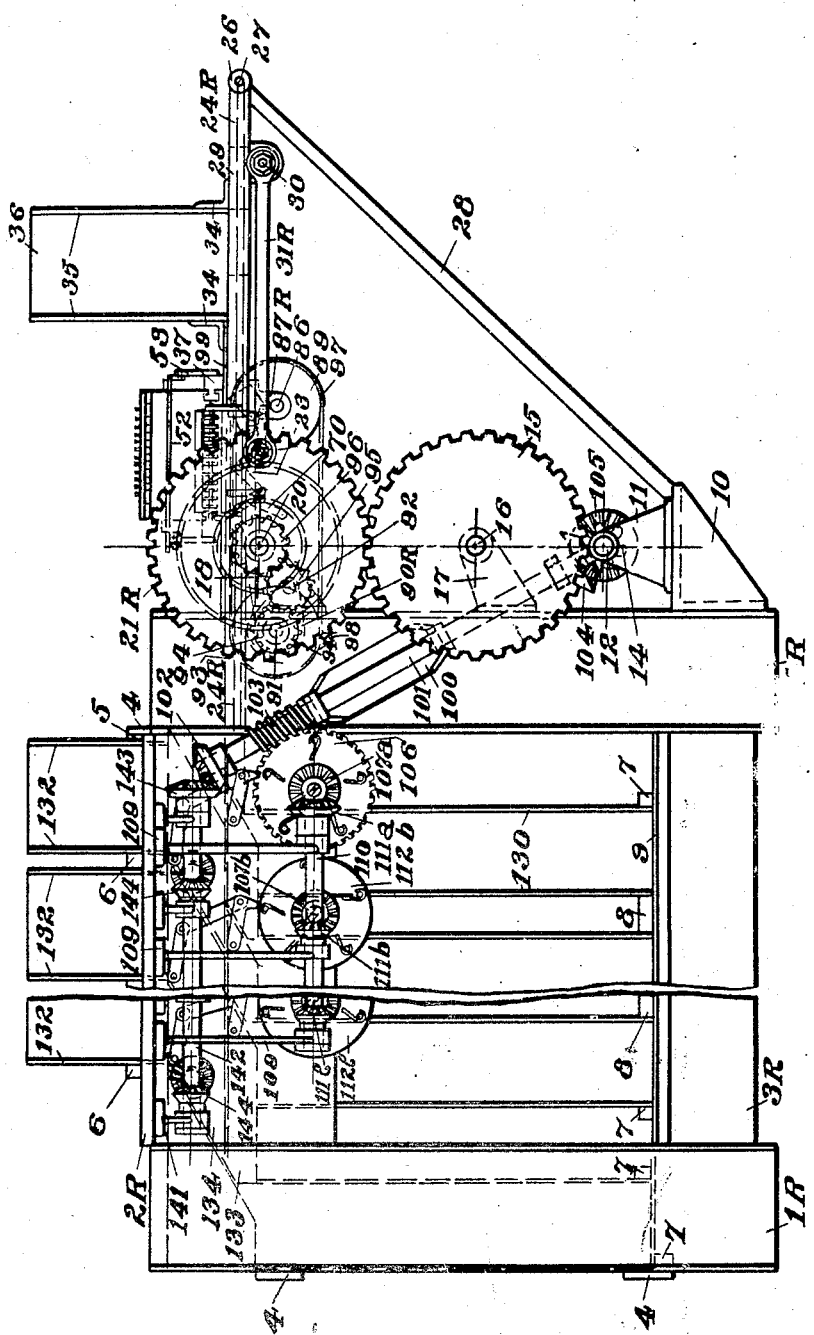
Figure 3:
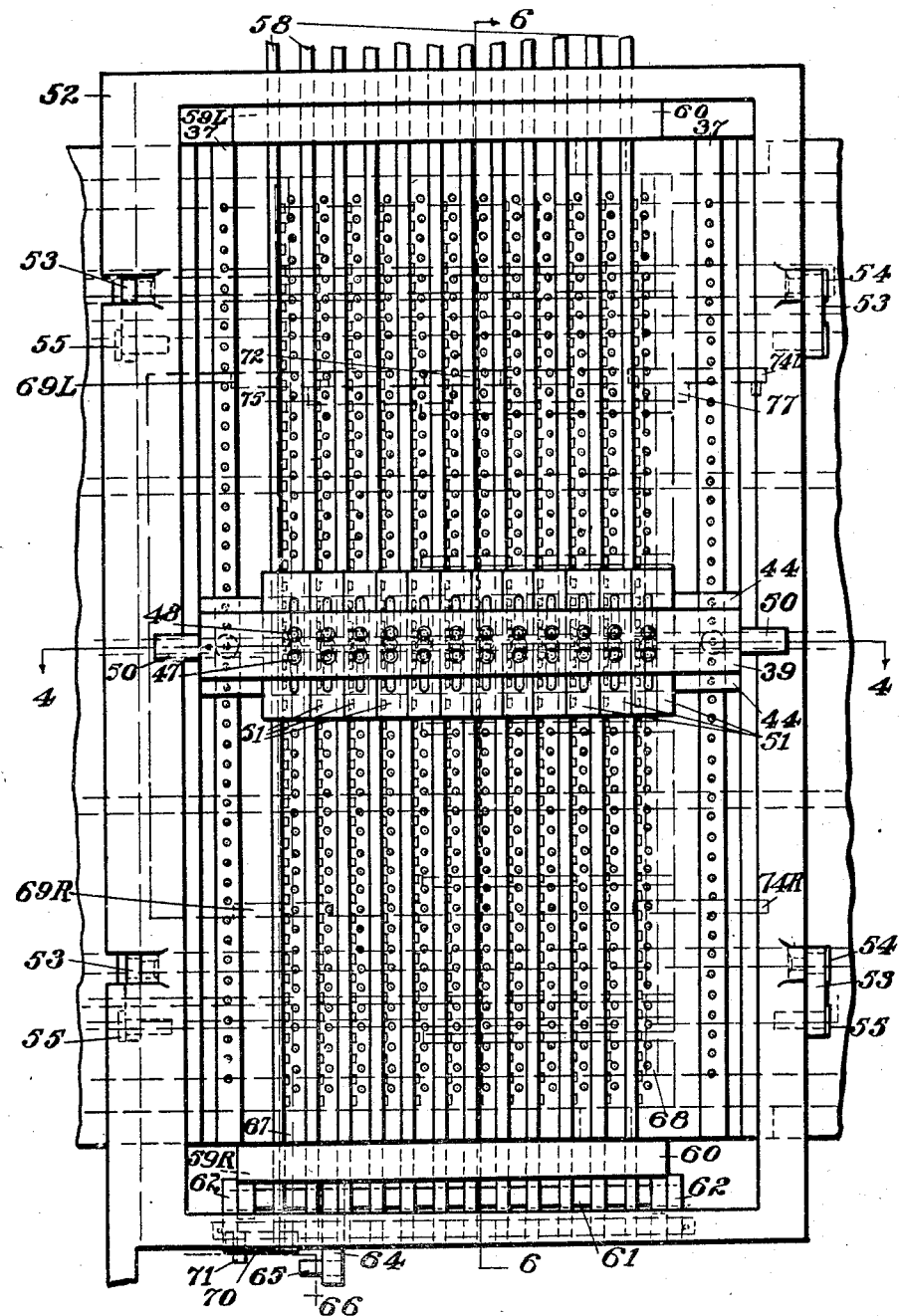

In said annexed drawings:

Fig. 1 is a plan view of my improved machine showing the general arrangement but with a certain portion of the conveyor mechanism removed and broken to show two compartments; Fig. 2 is a side elevation of the right side of the machine as shown in Fig. 1; Fig. 3 is an enlarged plan view of the selecting or registering mechanism designated in Fig. 1 as group A; Fig. 4 is a section on the line 4—4 in Fig. 3 showing the crosshead in an advanced position in its travel as compared with the position in Figs. 1 and 2; Figs. 4a and 4b are details of the pins and locking plates therefor; Fig. 5 is an enlarged section of the elevation showing details of the conveying and timing mechanism indicated in Fig. 1 as group B; Fig. 6 is a diagrammatic view showing a section on the line 6—6 in Fig. 3; Fig. 7 is a section on the line 7—7 in Fig. 5; Fig. 8 is a section on the line 8—8 in Fig. 1; and Fig. 9 is a diagrammatic view showing the substitution of electrical means for the mechanical means illustrated in the previous figures; Fig. 10 is a perspective view of the pin box locating means shown in Fig. 4; and Fig. 11 is a partial view of a card for use in my apparatus.

The present sorting mechanism consists of groups of two or more pins suitably arranged to register with holes in a card, each group of pins actuating a different set of mechanism to provide for suitable sorting according to the location on the cards of the punched holes. The arrangement of each group of pins is such that one or more pins will register with the holes in an homologous position on the card. The machine is so constructed that when one punched entry has been made upon a card, additional properly located punched entries will cancel the sorting effect of the first entry, in this way making it possible to make effective a different grouping by means of new punched entries.

It is obvious that this should cover all mechanical arrangements for sorting where, having given a plurality of groups for sorting, any entry can be made and later annulled and any new entry made effective within that set of groupings, and whereby the second or subsequent different entries can be made effective in any sequence. It is obvious that the application will apply equally well to the effecting and making ineffective of electric currents by means of contacts through or effected by the punchings on the card and that various electrical, mechanical, or fluid arrangements for registering with the holes in the cards might be made without coming outside the scope of this invention.

In addition, my device incorporates a distinctly new improvement in that, by mechanical means, all cards not being selected in any group, being conveyed to an overflow compartment in the order in which they are presented to the machine, I insert for every card assorted according to a definite grouping another card, punched according to the grouping designated, which card takes the place of the selected card, in the regular order, in the overflow compartment.

In doing which I accomplish the following results; firstly, that I am able to refer to the group of cards in the overflow compartment and by locating the card appearing in place of the card for which I am searching, I am informed as to which group of selected cards it appears in, thus keeping an effective trace on any card selected from the main group of non-selected cards; secondly, that, in desiring to replace the selected cards in their old position and sequence with respect to the group of non-selected cards or with each other, by putting these cards in their respective insert hoppers corresponding to their respective groups, and in the same order in which they were discharged, that, if all the overflow or inserted duplicate cards are sent through the machine once with the registering head at the same setting as used for discharge, the selected cards will travel into the overflow compartment and be distributed with respect to the non-assorted cards and with each other, in the same order as they held originally, the duplicate insert cards being removed according to their particular groupings. This supplants the method of re-assorting groups whereby the reassorting is done by the registered numerical sequence as registered on the card and which necessitates a complete passage through the machine for each digit in the numerical designation on the card. The actual operation of this process will be discussed in detail later.

In addition to which my mechanism may be adapted to the mechanical sorting of non-perforated cards according to a prearranged designation upon a set of master cards, properly perforated. This feature also will be explained later.

Finally, in particular, my invention covers the general arrangement of the selecting mechanism; the means adopted for the operating of the insert hoppers; and the timing mechanism, whereby, any registration being made on a card, this mechanism is actuated and automatically set and is so constructed as to not act on any card other than the one which caused said registration and to act just as the card reaches the proper stage on the conveyor, to be acted upon. The timing mechanism, however, may act upon a card other than the one causing the registration whenever said registering card is replaced by another card in the same relative position in the conveyor. As designed, it permits of four different cards being operated upon simultaneously in the conveyor but the design can obviously be adapted to any number as desired without changing, in any way, the essential features of the design.

To such ends, my invention comprises, in substance, a supporting frame, means or mechanism for causing actuating movement to the various working parts; a card hopper for the reception of the perforated cards; means for feeding the cards one by one from the hopper to the selecting mechanism and for passing them through the subsequent sorting or grouping mechanisms; a set of discharge hoppers for receiving the cards selected, one for each particular group as designated; a set of insert hoppers for receiving cards to be inserted in the groups of cards passing through the mechanism; and an overflow hopper for the reception of all cards not assorted and all cards coming from the insert hoppers and not otherwise deflected.

The feeding hopper comprises, in substance, an arrangement of plates and supporting bars rigidly attached to the main body of the machine and suitably arranged to receive the perforated cards; a cross head traveling in grooved ways beneath the cards in such a manner as to select one card at each reciprocation of the mechanism and to convey it to the selecting mechanism, whereupon it returns to obtain the next card in sequence for similar action.

The selecting mechanism comprises, in substance, two perforated plates, one above and one below the card, when in position for registering and with the perforations of each plate corresponding to possible perforations, according to the arrangement on the card; a mechanism for properly stopping the card and locating it in the correct position with respect to the perforated plates and for preventing the return of the card with the cross head; a registering head with a group of reciprocating yielding pins, the head being slidably attached to the registering mechanism so as to bring the group of pins into position to act upon any column or columns of perforations on the cards, as required; suitable mechanism for reciprocating the pins, bringing them into yielding contact with the cards, permitting such pins, as register with perforations and are hence not prevented from further motion by the card, to advance to positions different from those of pins engaging the card; an arrangement of selecting bars suitably arranged and released and suitably engaged with the registering pins as to permit any bar released by its respective group of pins to operate; suitable transmitting mechanism for transmitting the impulse from the selector bars to the proper selective and timing mechanism in the machine; and suitable means for conveying the cards from the registering mechanism to the conveyor of the machine.

The conveyor and hopper arrangement of the machine consists, in substance, of a series of bars upon which the cards may travel until properly deflected by deflector pins; a series of rolls and conveyor belting suitably arranged therein which grips the cards and carries them, unless otherwise interrupted, to the overflow hopper; a series of discharge hoppers, being in substance, plates rigidly fixed to the machine and arranged to receive and contain the cards, as required; said series being equipped with suitable timing mechanisms, adjusted to properly receive the impulses transmitted from their respective selector bars; means for properly timing these impulses to the respective compartments; deflecting pins so actuated as to be interposed before the proper card at the proper time to deflect it into the proper compartment; also insert compartments, being, in substance, plates rigidly attached to the frame work of the machine and suitably arranged to contain cards of shape similar to the ones being assorted, the cards being supported upon cross bars; a suitable conveyor arrangement, linked with the deflector pin mechanism so as to bring the conveyor into contact with the bottom card of the hopper, simultaneously with the operation of the pins to deflect the main cards; a suitable arrangement of rolls and conveyor belting for conveying the card so inserted into the main conveyor where it appears in its order of sequence, in the position of the card deflected to the discharge compartment; and finally, an overflow compartment, receiving in the proper order, all cards not deflected to the discharge compartments and all cards inserted from the insert compartments or hoppers.

In the accompanying drawings the feed axis is considered as the main axis and the axis of the main shaft as the transverse axis of the machine.

Referring to Figs. 1 and 2, there are two pairs of supporting members 1R and 1L, fixedly attached to longitudinal members 2R and 2L and 3R and 3L. These members are held in a rigid frame work by means of a plurality of cross strips 4 and 5, and a plurality of cross bars 6, 7, and 8, the plate 9 is interposed between cross bars 7 and 8 and the members 3R and 3L and thus acts as the bottom plate for discharge hoppers to be described later. A bracket 10 is fixedly attached to the uprights 1R and 1L and upon this bracket are fixed bearings 11, which carry a drive shaft 12. Fixedly mounted upon the drive shaft 12 is a pinion 14. A suitable motor or other power means (not shown) is mounted upon the drive shaft or geared thereto to furnish the operative power for the machine. A bearing bracket 17 is fixedly attached to one of the uprights 1R and a stud 16 is fixedly mounted upon bracket 17, while an intermediate gear 15 is rotatably mounted upon stud 16 and meshes with pinion 14.

Mounted on the uprights 1R and 1L respectively are bearing brackets 18 and 19 in which a main operating shaft 20 is rotatably mounted. Fixedly attached to this shaft 20 are gears 21R and 21L. The gear 21R meshes with the intermediate gear 15.

There are two cross head conveying bars 24R and 24L with a base block 23, properly grooved to fit them and rigidly attached to them. The bars 24R and 24L are rigidly attached to the uprights 1R and 1L respectively. The block 23 is properly grooved to permit the insertion of the longitudinal strips 25a, 25b, 25c, 25d, and 25e, which are also rigidly attached to it in a suitable manner. Strips 25a, 25b, 25c, 25d, and 25e are spaced by spacers 26 and held rigid at this point by the tie bar 27. A pair of supporting struts 28 are fixedly attached to the bracket 10 and to the tie bar 27, thus forming a rigid construction.

A cross head 29 is slidably mounted on the cross head conveying bars 24R and 24L for longitudinal movement thereon. The cross head 29 is properly grooved to permit the longitudinal bars 25 to pass through it without interference and is also adapted to carry a cross bar 30.

The gears 21R and 21L have fixedly attached to them studs 32R and 32L, respectively, upon which are rotatably mounted connecting rods 31R and 31L. The other ends of connecting rods 31R and 31L are rotatably connected to the cross bar 30.

A cover plate 99 is fixedly attached upon the cross head conveying bars 24R and 24L, as shown, leaving enough clearance between it and the base block and the longitudinal strips to permit the free passage of a card. Transversely located on the bars 24 and on top of the plate 99, respectively, are the two angles 34, fixedly attached thereto. Plates 35 are fixed to angles 34 and plates 36 are fixed to plates 35, the group 34, 35 and 36 forming the feeding hopper, the cards resting on the longitudinal bars 25.

The cross head 29 has a narrow projection 40O which has a thickness somewhat less than that of a card and is so adapted that it will engage the bottom card in the hopper to the exclusion of the others and carry it forward to the registering or selecting mechanism. Projecting fingers 29a—29f assist in supporting the card during a forward motion of the cross head 29.

The next group of mechanisms (Figs. 1—4—6 and 10) may be termed the registering or selecting groups. This mechanism includes two supporting ways 37, parallel to the main axis and supported by and rigidly attached to the cross plate 99. Movable longitudinally of these ways in a pin box or selecting head made up of upright members 38, cross members 39, 40, 41, 42, and 43 and side plates 44, all secured rigidly together. The uprights 38 are both provided with T-shaped slots, see Fig. 10, to adapt them to move slidably transversely upon the supporting ways 37. Plungers 45 are adapted to reciprocate vertically in suitable holes in the uprights 38, while springs 46, placed within these holes beneath the shoulders on the plungers 45, are in constant compression and tend to lift the plungers. Two pairs of grooves at $m$ and $n$ are adapted to receive the handles of the plungers 45 so that if the handles are turned at right angles to the main axis, the plungers are free to reciprocate in their holes but so adapted that, by turning them parallel to the main axis, the handles will be seated in the slots m or n, depending upon the plunger's location. The plungers may thus be locked in either an upper or lower position. In the lower position the projecting points of the plungers are adapted to seat in the cross ways 37. With both plungers up, the pin box is free to move slidably along the cross ways parallel to the main axis.

The pin box may be locked with respect to the cross ways by lowering the plungers so that their points seat themselves in one of the pairs of holes in the cross ways and the plunger handles turned in a position n, as shown in Figs. 4 and 10, thus locking them in this position.

The cross members 39, 40, 41, 42, and 43 are provided with series of aligned openings (see Fig. 4) in which are slidably mounted groups of reciprocating pins 47 and 48 (in this case twelve groups), each group corresponding to a given selecting and sorting group in the machine. In this case two pins are shown to a group. The openings in the member 42 are non-circular and are adapted to receive similarly formed sections of the pins at this point, the arrangement preventing rotation of the pins. The cross member 41 is designed with an oval hole so that a pin may pass through it, clearing the shoulder for the purposes of assembly and then be moved to a narrower section to form against a shoulder against which springs 49 may act. Springs 49, being in compression between the fixed shoulder in cross member 41 and the yieldable shoulder on the pin 47 or 48, tend to depress their respective pins in a downward direction. The lifting cross bar 50 is slotted similarly to the cross members 41 to permit of assembly and to lift against the shoulders of the pins, thus acting against the force of the springs 49. The lifting cross bar 50, if reciprocated, will permit a corresponding motion in the pins. Member 50 is adapted to reciprocate slidably without rotation in suitable slots in the uprights 38, within the limits permitted by the fixed cross members 40 and 41. Locking keys 51 are drilled and grooved in a suitable manner (see Figs. 3 and 4b). In operation, the lifting member 50 operates between the central and the lower position, through which range the larger diameter of the pins reciprocates in the hole of the locking keys, preventing any motion of the keys (see Fig. 4a). To lock any pins, (see Fig. 3), the cross member 50 is lifted to its highest position, bringing the small diameters of the pins into the holes in their respective locking keys. By moving the key for the particular pins in question, along the main transverse axis in either direction, the hole adapted for the larger diameter of either pin can be brought under the alternate pin, thus interposing the slot in the key beneath the shoulder of the first pin, locking it from further downward motion. Either pin may be locked in this way. By moving the key the full allowable distance in either direction, the slot will be brought under the shoulders of both the pins, thus locking both. The lifting member 50 rests upon lifting frame 52. Four links 53 are rotatably attached to the lifting frame 52 and also attached rotatably to the cross ways 37 by studs 55. By this means a transverse motion of the lifting frame will raise or lower the lifting member 50, thus transmitting the motion to the pins. A pin 56 (see Fig. 1) fixedly attached to the lifting frame 52 meshes with the cam 57 in the cam path "o". The cam 57 is mounted rigidly upon main shaft 20, rotating with it. The rotation of this shaft, thus transmits the proper motion to the pins as hereinafter explained.

A set of selector bars 58 (see Figs. 3 and 4), one for each group of selecting mechanisms, are arranged transversely in the machine. They are supported by brackets 59R and 59L and held in position vertically by the bracket caps 60. The brackets are fixedly attached to the bars 24R and 24L. The selector bars are mounted to permit of a free transverse motion in these brackets. The selector bars also pass through the pin box, (see Fig. 4) and are supported therein to be freely movable in a transverse direction.

It will be observed that each pin, (see Figs. 3, 4, and 6) has a projection on it, adapted to slide freely between any pair of the series of projections shown on each selector bar, depending upon the location of the pin box. The movement of the selector bars is free, except as the projections on the pins interfere with the projections on the selector bars. It is also clear (see Fig. 6, a schematic arrangement showing one set of pins and projections) that the movement is free if pin 47 is depressed and pin 48 is not depressed; and that the movement is arrested by the failure to depress pin 47 or the depression of pin 48. The operation and application will be discussed later.

In the bracket 59R is rotatably mounted a shaft 61 having arms 62 fixedly attached thereto and also auxiliary arm 64. The arms 62 in turn carry pin 63. The slots in the selector bars are adapted to permit the free movement of the pin 63 therein as the arms 62 are reciprocated or oscillated. A pin 65 is fixedly mounted in the arm 64. This pin 65 travels in cam path "p", (see Fig. 1) in the cylindrical cam 66 which is fixedly mounted upon the main shaft 20. Operation of this cam 66 oscillates the arm 64 and permits, at such times, all selector bars, not locked by the selecting pins, to move transversely. The cover plate 99 and the base plate 23 are properly drilled to permit the free passage of such pins as are lowered during the operation of the mechanism. Referring to Fig. 4, there is a shaft 67 and shaft 68 rotatably mounted in the base block 23 which is properly recessed, as shown, to permit the inclusion of the card locating mechanism, to be described, and is also splined to permit the inclusion of the cross head projecting fingers 29a—29f, when the cross head reached the full advanced position.

Two fingers, 69R and 69L, are fixedly mounted upon shaft 67 in such a manner that oscillation of the shaft will alternately project and withdraw these fingers 69R and 69L across the path of the card; thus acting as a stop for the leading edge of the card to locate it beneath the electing pins. Fixedly mounted on the shaft 67 is a crank 70 (see Figs. 2 and 3) in which is fixedly mounted a pin 71 which travels in a cam path in the face of the cam 66. Thus the rotation of the main shaft, by oscillating the pin 71 in the cam path as designated, will alternately (and at proper intervals) protrude and retract the fingers across the path of the cards.

A crank 72 is rotatably mounted upon the base block 23 by means of a stud 73. Fingers 74R and 74L are fixedly mounted upon the shaft 68, and a link 75 connects finger 69L to the crank 72 (as shown) being rotatably attached to both by studs 76. A link 77 is rotatably mounted upon the crank 72 by a stud 78 and is linked to finger 74L by stud 79, this stud traveling in a slot in link 77. Springs 80 and 81 attached to the base block 23 with pins 82 and 83, tend to rotate the fingers 69 R and 69 L, and 74 R and 74L, to cause them to protrude across the path of the cards. Fingers 69 R and 69 L are controlled positively by the cam path in 66 while the release of them permits the release of 74R and 74 L unless otherwise restricted. The finger 74 L has fixedly attached to it a pin 84. Attached to the projecting finger 29b on the cross head is a stop 85. When the fingers 74 R and 74 L are released by the movement of the fingers 69 R and 69 L, the the pin 84 comes in contact with stop 85 preventing the obtruding of fingers 74 R and 74 L across the path of the card until the cross head reaches the end of its travel, whereupon the pin 84 clears the stop 85 and the fingers 74 R and 74 L are actuated by the spring 81 and cross the path of the card; thus locating it on the trailing edge and preventing its return with the cross head.

A shaft 86 (see Figs. 2 and 4) is rotatably mounted in bearing brackets 87 R and 87 L, which are in turn fixedly attached to the bars, 24 R and 24 L, respectively. Pulleys 89 are fixedly mounted upon this shaft 86.

Two brackets 90 R and 90 L, (see Fig. 2) are fixedly attached to uprights 1 R and 1 L which carry a shaft 91, rotatably mounted therein. A stud 92 is fixedly mounted on the bracket 90 R. Fixedly mounted upon shaft 91 are two pulleys 93 and a gear 94. Gear 95 is rotatably mounted on stud 92 meshing with gear 94 and also meshing with a gear 96, fixedly mounted on the main shaft 20. Hence, rotation of the main shaft drives gear 94 through the intermediate gear 95 by means of gear 96, thus rotating the pulleys. Suitable conveyor chains 97 are carried between the sets of pulleys, 93 and 89, (Base block 23 is properly adapted and grooved to furnish clearance for the chain conveyor and projections). Two pairs of projections 98 are properly spaced upon the conveyor chains 97, to pass through grooves in the base block 23 and cover plate 99 and to engage the cards at proper intervals and carry them along the card paths. This completes the entire selecting mechanism.

Sorting mechanism: A bracket bearing 100 is attached fixedly to upright 1 R (see Fig. 2). A shaft 101 is rotatably mounted within bracket bearing 100. Fixedly mounted upon the shaft 101 is a bevel gear 102, worm gear 103 and bevel gear 104. Fixedly mounted upon the drive shaft 12 is a bevel gear 105, meshing with bevel gear 104. Hence movement of the drive shaft will drive the intermediate shaft 101 through the gears 104 and 105.

A worm wheel 106 meshes with worm 103, being driven thereby, and this worm wheel 106 is fixedly attached to bevel gear 107a. The two combined are rotatably mounted upon the stud plate 108a (see Fig. 8). A plurality of stud plates, 108a—108L are fixedly mounted upon the longitudinal member 2R. A plurality of suspension brackets, 109 are fixedly attached to the longitudinal member 2R and carry, rotatably mounted therein, a timer shaft 110. Mounted upon shaft 110 is a plurality of bevel gears 111a—111L; meshing with the bevel gears 107a—107L which are in turn mounted on the plurality of stud plates, 108a—108L, respectively. Shaft 110 is driven through the gears 107a and 111a. Fixedly attached to the gears 107 are the cam plates 112a—L. Five cams 114, (see Figs. 5 and 8), are mounted on each cam plate, being arranged to rotate on the axes of five studs 113, each one fixedly connected to its respective cam, and each spaced at equal intervals from the others on the cam plate. The springs 115 are attached to these studs and also to the cam plates in such a manner as to tension them constantly in a clockwise direction, with respect to the cam plate and about the axes of the studs, (see Fig. 7). To each cam is fixed a pin 116 which, normally, because of the tension in the spring 115, travels in the inner path "q" on the grooved surfaces of the stud plate with which it engages.

A plurality of bracket bearings 117 (see Fig. 8) are attached to the longitudinal member 2L. They are adapted to carry, mounted rotatably therein, a plurality of shafts 118a—118L, (see also Fig. 1). Each selector bar, 58, is linked in its respective longitudinal shaft 118 by means of links 119a—L, the pins 120 being fixedly mounted in the selector bar and sliding in a slot in the link 119, (see also Fig. 6). Hence a transverse movement of the selector bar transmits an oscillation to its respective longitudinal shaft 118.

Each longitudinal shaft has fixed to it a link 121, (see Fig. 8) which is connected to its respective timer rod 122 by a pin 123, fixed in the link 121 and sliding in a slot in the timer rod 122. Hence the oscillatory motion of the shaft 108 will be transmitted through the link 121 to the timer rod 122.

The rod 122 is slidably mounted in members 2R and 2L and a spring 177 is placed upon rod 122 and is held in compression by pin 178, fixedly attached to the rod 122, the spring tending to move the rod 122 transversely to the right. Fixedly attached to the end of rod 122, is an arm 124 in which is mounted the plug 125. The plug is so shaped that a transverse movement of the timer rod 122 will protrude it into the cam path "q", of the cam pin 116, (see Fig. 5) causing the next successive pin to ride over the surface of the plug to the outside cam path "r" on the stud plate 108. This will compel the pin to make a complete circuit on the outer "R" path before being permitted to drop back to the inner path, which causes the cam surface "s" of the cam, 114, to protrude above the surface of the cam plate 112. An arm 126 is fixedly mounted to a shaft 127 which is in turn rotatably mounted in the longitudinal members 2R and 2L. This arm 126 rides on the surface of the cam plate 112. When the cam 114 is caused to protrude beyond the surface of 112, it engages arm 126 and lifts it for a suitable period of time, according to the design of the cam surface "s". Arm 126 is tensioned in a clockwise direction and held against the cam surface by the spring 128. Fixedly mounted upon shaft 127 are two intercepting pins 129 which are lifted when arm 126 is lifted, thus deflecting the course of the card in the conveyor to its respective discharge hopper. The position of the plug 125 with respect to the arm 126 is different for each group of mechanisms, being controlled by the timing and the distance between the discharge hopper and the selecting mechanism. This completes the timing and selecting mechanism.

Each discharge hopper is formed by side plates 130 and the right and left plates 131, the right plate being detachably fixed to permit the removal of the cards when desired.

Plates 130 are attached to the longitudinal members 2R and 2L or to the uprights 1 and to the cross ties 7 and 8. The right and left plates are attached to the said plates 130.

The insert hoppers are formed by side plates 132 fixedly attached to the cross ties 6 and right and left plates 132a, detachably attached to the side plates 132 and to the longitudinal members, 2R and 2L.

The support for the card conveyor is made of a series of sets of five plates of each of the two kinds shown, 133 and 134; one set being used for each group of selecting mechanisms. Plates 133 are held in position by the tie rods, 135, two of which pass through each set of five plates, the plates being spaced by spacers 136 and the rods held in position by nuts 137.

The upper plates, 134 are held in sets of five by the pairs of tie rods, 138, being spaced by the spacers 139 and tied rigidly by nuts 140.

Suspended from member 2R is a plurality of bearing brackets, 141. Rotatably mounted in these bearing brackets is auxiliary shaft 142. Fixedly mounted on shaft 142 is bevel gear 143, which meshes with bevel gear 102. This drives shaft 142 through the gears 102 and 143. A plurality of bevel gears 144a—L are fixedly mounted on shaft 142. Rotatably mounted on longitudinal members 2R and 2L are a plurality of shafts 145a—L. Fixedly mounted upon shafts 145 is a plurality of bevel gears 146a—L, meshing with the gears 144a—L, respectively. Thus, the rotation of the auxiliary shaft 142 rotates shafts 145a—L.

Rotatably mounted in longitudinal members 2R and 2L are shafts 147 and 148. Fixedly mounted on shafts 145 are the gears (spur) 149, and fixedly mounted on shafts 147 are the spur gears 150; fixedly mounted on shafts 148 are the spur gears 151. Gears 149 and 151 both mesh with gears 150, thus 150 and 151 are driven by 149. Fixedly mounted between the longitudinal members 2R is the plurality of shafts 152a—L. Rotatably mounted on each shaft 152 is the pair of rollers 153. Fixedly mounted between the outside pairs of plates 134 (134 a and b and d and e) are the shafts 154a—L, 155a—L, 156a—L, 157a—L and 158a—L, upon which are mounted the pairs of rollers 159, 160, 161, 162 and 163 on each shaft respectively. Rotatably mounted on shaft 127 are rollers 164 and fixedly mounted on shafts 148 are rollers 165. A suitable belt conveyor passes over each set of rollers 165 to rollers 164, to rollers 163 and back to rollers 165, being driven by rollers 165. A similar suitable belt conveyor passes over each set of rollers 166, fixedly attached to shaft 147, thence to rollers 160, under rollers 161 and rollers 159, over rollers 153, back to rollers 160, and thence back to rollers 166 from which it is driven.

Shaft 167 is suitably mounted in the longitudinal members 2R and 2L. Fixed on shaft 167 is an arm 168, which is rotatably connected to a link 169 by means of a pin 170. A link 169 is also rotatably linked to arm 126 by means of a pin 171. Hence, a lifting of arm 126 causes a corresponding lift in arm 168 and a corresponding rotation of shaft 167. Fixed to shaft 167 are the two pairs of arms 172 (see Fig. 8) between which are fixed the shafts 173. Rotatably mounted upon shaft 173 is the roller 174. Fixed to shaft 145 is the roller 175. Passing over rollers and driven by it is a suitable conveyor belt from which it passes over rollers 176, rotatably mounted on shaft 167, thence to rollers 174 and back between rollers 162 and 176 to rollers 175 again.

The above constitutes the essentials of my invention. A suitable modification of the roller arrangement conveys the card to the first group of conveyor rolls and also from the last group of conveyor rolls to the overflow compartment. Bolts, screws, rivets, tie rods, etc., have been omitted for the sake of clearness.

Having briefly described the mechanism of my invention, I will outline the general application. However, it is understood that the various combinations and arrangements and usages are very numerous, each particular application being adapted to the specific job in question.

In general, we have a group of cards on which certain information is placed by means of holes punched in predetermined spaces, the positions of the holes being the determinant of the information. Since the operation of the selective apparatus depends not only upon the position of the hole punched, but also upon the absence of a punched hole in the corresponding position in the adjacent column, it is clear that by punching a hole in the second position, that the effect of the first perforation is nullified and a perforation elsewhere in the same column with the first hole may be made effective. The capacity of such apparatus to accomplish this result is very valuable in the use of planning departments, where it is desirous of keeping records of orders in different departments and still have means for locating each order.

The orders may be punched according to their various departments and also as to the dates upon which they are scheduled for these departments. On a given day, all orders can be selected from the others, being the ones scheduled to be worked on that day, and then re-assorted according to the departments in which they are to be worked. From them a daily work sheet can be sent to each department. Upon receiving reports as to the completion of orders, the cards can be fed through a gang punch and the date and department number cancelled and the new department and date of completion recorded thereon. Whereupon, the cards can be replaced in the machine in the insert hoppers and the entire lot replaced in their original order with respect to the other orders with one passage through the machine. As stated before, this is only one of many applications to which the machine is adapted. As an illustration, see Fig. 11.

A fragmental view of a card 300 of one sort which may be used in this machine, is shown in Fig. 11. It illustrates one of the many adaptations to which this machine will apply. This is a card used to record the location and scheduling of work in operation in a machine shop, the record being the sort usually maintained in a planning department.

The first five columns 301 represent the designation of the particular lot or the order number of the same, in this case 97854.

The next three columns 302 refer to twelve departments or operations. Perforations are placed in the first column for every department through which the work passes, in this case, departments 1, 3, 5, 6, and 9. When the job is available for a department, a perforation is made in the second column. In this case the work has been started in departments 1, 5, and 6. When the work is finished in a particular department, a perforation is made in the third column. In this case, the operations in departments 1 and 5 have been completed.

The next nine columns 303 are used for the dates on which the work is scheduled and are treated in the same manner as the columns for the departments. They are in three groups of three each for the dates of the month, 1st to 10th, 11th to 20th, and 21st to 31st, respectively.

The card shown notes work is to be done on the 7th, 8th, 11th, 12th, 13th, 16th, 17th, 18th, 21st and 23rd. The work for the 7th, 8th, 11th, 12th, 13th, and 16th, has been completed while the job is available for the work of the 17th.

The mechanical operation is briefly this:

Cards properly perforated are placed in proper position in the feeding hopper. Adequate power means being applied to the drive shaft 12, to rotate it in a counterclockwise direction, the motion is transmitted through pinion 14 to gear 15 to gear 21R and to the main shaft 20, and gear 21L. By means of the connecting rods 31R and 31L, between the gears 21R and 21L and the cross head 29, the cross head is reciprocated in the cross head conveying ways 24R and 24L, through a suitable distance. In passing beneath the feeding hopper, this cross head is so adapted as to engage the bottom card and carry it forward beneath the pins in the selecting mechanism.

The rotating main shaft rotates the cam 66 and the cam path which arm 70 follows. The cam is so adapted as to interpose the fingers 69 before the card during its travel with the cross head; at the end of whose travel, fingers 74 are interposed to keep the card in the correct position, whereupon, the cam path "o" in cam 57 actuates the lifting frame 52 to lower the lifting bar 50. The pins 47 and 48 being depressed by the springs 49, bear against the surface of the card and such pins as engage with holes in the card are permitted to reach the extreme bottom position of their travel. Whereupon, the cam path "p" in the cam 66 actuates the arm 64, releasing the selector bars 58. The springs 177 pressing against collar 178 fixed on rods 122 tending to move rods 122 to the right in Fig. 1 and to the left in Fig. 8, tend to swing arms 119, and thus to move the selector bars 58 transversely to the left. It will be observed, for any particular selector bar, if neither of its respective pins 47 and 48 are depressed to their bottommost position, that the projection on pin 47 will lock the selector bar, preventing its actuation to the left; plug 125 is interposed into the cam path on the stud plate, the pin 116 on the next succeeding cam 114, is lifted to the outer cam path "r" and the cam set in position to lift the arm at the correct time.

The cam surface in cam 66 releases the stopping pins 69 and 74, leaving the card clear. The cam path "p" actuates the arm 64, retracting the selector bars 58 and the plugs 125; the lifting frame is then actuated, returning the pins to their original setting and the mechanism is ready for the second card. As the cross head starts forward with the second card, projection 98 on the conveyor chains 97, engages the first card and carries it along the longitudinal axis to a point where it is gripped with the first conveyor rolls and carried into the conveyor section.

The card is carried through the conveyor section longitudinally, below the plates 134 and above the plates 133. Simultaneously with its near approach to the correct compartment, the cam surface "s" on the cam 114, engages arm 126, lifting deflector pins 129 which interpose themselves across the path of the card deflecting it into the correct compartment. Simultaneously, the link 169 lifts the movable rolls 174, bringing them into contact with the bottom cards in the insert hoppers.

In each insert hopper will be placed blank multicolored cards, punched in the column by which grouping of the cards is being controlled and each one is punched with the respective digit. The contact of rolls 174 with the bottom card grips it and draws it into the conveyor space between plates 134 from whence it is carried down to the main conveyor to the overflow compartment in place of the card which passed into the discharge hopper. This completes the original operation.

To replace the cards, the cards selected and discharged into the discharge hoppers, are replaced in their respective insert hoppers in the same order as discharged. The entire lot of cards in the overflow hopper, consisting of cards not selected and blank insert cards, is fed through the machine from the feed hopper, with the same setting of the selector pins as previously used. With the machine in operation, the cards not selected previously will pass through to the overflow hopper. The blank insert cards will be assorted out in their respective discharge hoppers and the original cards, now being in the insert hoppers, will fall into their proper sequence.

As an additional feature to sort blank cards, according to a predetermined set of master cards, the selector pins for the first compartment are locked in the top position. The blank cards are put in the first insert hopper and the machine started. Since two sets of selector bars will now be operative, all the master cards will fall into the first discharge hopper while the blank cards will be fed from the first insert hopper into the discharge hoppers as determined by punchings on the master cards.

The advantages of this function are manifold, as, of aid in transferring entries to be posted from one group of cards to another.

Another advantage to be observed would be in connection with the replacement of sorted cards after a series of sortings.

If cards to be sorted are placed in the receiving hopper in this manner, and other cards having perforations in a certain zone arranged in numerical order are placed in the first insert hopper, then these cards containing this numerical designation are sorted according to the designations which control the sorting on the cards in receiving hopper. If these main cards in said receiving hopper, after first being used to arrange said numerical guide cards, are then sorted, it is obvious that when it is desired to return these main cards to their former order that by reversing the process the guide cards being used in the reversed manner to control the sorting of said main cards, that they will tend to regain their old sequential order, or in other words, replace the main cards in the order they originally had when they broke up the order of the guide cards.

Should it be desired to do the operations of sorting the main cards and guide cards simultaneously, the process would be this. The guide cards are placed in some middle insert hopper, as for example, No. 6, and the pins for actuating this hopper are locked in an upper position, as previously explained. To designate a number under this arrangement two holes in the same column on the card, as 1 and 12, 2 and 11, 3 and 10, etc., would be punched. Hence for every main card dropped in No. 1 hopper a guide card would be fed into No. 12 hopper, etc. Any number of sortings may be effected thus within the range of the machine. When it is desired to replace the main cards the relative positions of the guide cards and main cards are reversed. The guide cards now control the sorting of the main cards. As the guide cards were originally in a given order according to the punched designation thereon it follows that they will effect the replacement of said main cards in their old order.

While the above illustrates the general principle, it is obvious that the methods of effecting the same are manifold. The device of using two perforations may be substituted by direct connections from one sorting pin to two hoppers instead of one. The number of hoppers available for use need not be limited to twelve, this number being used to illustrate the principle involved.

By electrical means similar to those shown in Fig. 9 in which there is a pin box frame 204 having twelve pairs of pins, 201a—1 and 202a—1 fixed in 204, as shown, each pin being insulated from the others.

Cross bars 203a—1 are located beneath the pins, as shown, and the cards pass along the card path, below the pins 201 and 202, and above the cross bars 203, thus breaking the contact between each pair of pins and its respective cross bar. The pins are sprung sufficiently to tension them against the cross bar but to permit of the card being forced beneath them without injury to the card.

A series of wires pass from each pin, 201a—1 through flexible cable 205 to a series of 12 solenoids 206a—1, respectively. Another series of wires pass from each pin 202a—1 through the same cable 205, and thence to a series of 12 solenoids 207a—1, as shown. These pairs of solenoids 206 and 207 are each located on their respective timer rods 122a—1.

A series of wires connects each cross bar 203a—1 to its respective battery, thence to a circuit interrupter 208, and thence to the solenoids 206 and 207.

There is also a rotating drum 208 upon which two brushes ride, thus making and interrupting the circuit at the proper intervals.

The operation is as follows:

A card is fed into position beneath the pins. When it is in place, all circuit interrupters 208a—1 close their respective circuits. The card (beneath the pins) breaks the circuits between the pins and the cross bars, except at points where holes are punched in the card.

If a hole is punched beneath any pin 201, the pin 201 contacts with its cross bar 203 and the current flows through the battery thence to circuit interrupter 208 and through solenoid 207, thence through pin 201 to bar 203 and back. The solenoid 207 causes timer rod 122 to move transversely and the selecting mechanism, as previously described, is operated.

Should the adjacent hole to the one shown above be punched, the shunt circuit through solenoid 206 is closed also and the current flows through it.

The solenoid 206 is located to one side of solenoid 207 on the rod 122 with the center of mass of the rod between the two solenoids. Thus, the energization of the solenoid 207 exerts a pull on the rod in one direction and the energization of solenoid 206 exerts a pull on the rod in the other direction, nullifying the effect of the solenoid 207 and, in effect, cancelling the original entry on the card, as far as making it effective for sorting under that particular head is concerned.

Before the cards are removed from beneath the pins, the circuit interrupters 208, break the circuit again.

The usual mechanisms for feeding and locating are too well known in the science of card accounting to require their description here as are also the means for insulating the different circuits. The flexible cable is used to permit the setting of the pin box to any series of numbers of the cards, as previously described in connection with the description of the mechanical operation of the machine.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:

1. In mechanism of the character described, the combination of means for conveying cards, a sorting device including a series of movable pins arranged in groups and adapted to analyze cards having holes therein to effect sorting said cards, and the engagement of other pins in other cancelling holes in the cards bearing a certain positional relation to said first named holes rendering the sorting action produced by said first named pins ineffective, means adapted to render inoperative any desired group of pins.

2. In mechanism of the character described, the combination of means for conveying cards, a sorting device including a series of movable pins arranged in groups and adapted to analyze cards having holes therein to effect sorting said cards, and the engagement of other pins in other cancelling holes in the cards bearing a certain positional relation to said first named holes rendering the sorting action produced by said first named pins ineffective, and means adapted to render inoperative the pins positioned for engagement with said other cancelling holes.

3. In mechanism of the character described, the combination of a series of card receiving hoppers, a card sorting device adapted to open one of said hoppers for each card passing through said device, means for conveying said cards over said hoppers, and other means adapted to effect the opening of the selected hopper just prior to the arrival of the card actuating such opening to effect the removal of said card from said conveying means, said other means including movable cam elements adapted to open said receiving hopper and a double path cam for controlling said elements.

4. In mechanism of the character described, the combination of a series of card receiving hoppers, a card sorting device adapted to open one of said hoppers for each card passing through said device, means for conveying said cards over said hoppers, and other means adapted to effect the opening of the selected hopper just prior to the arrival of the card actuating such opening to effect the removal of said card from said conveying means, said means including movable cam elements and a double path cam controlled by the cards passing through the machine for controlling said elements.

5. In a machine of the character described, the combination of conveying means, means for analyzing cards bearing variously positioned holes therein, said cards being carried by said conveying means, sorting hoppers normally closed, said hoppers being adapted to be opened to receive said cards carrying certain holes, an overflow hopper, a sorting device adapted to engage one of said cards and then actuate one of said hoppers to momentarily open the same, depending upon the position of the holes in said card, and means including supply hoppers containing blank cards and single card feeding means therefor, each actuated by the opening of the respective sorting hopper, said feeding means being adapted to supply a blank card to said conveying means for each said first named card received by one of said sorting hoppers.

6. In a machine of the character described, the combination of conveying means, means for analyzing cards bearing variously positioned holes therein, said cards being carried by said conveying means, sorting hoppers normally closed, said hoppers being adapted to be opened to receive said cards carrying certain holes, an overflow hopper, a sorting device adapted to engage one of said cards and then actuate one of said hoppers to momentarily open the same, depending upon the position of the holes in said card, a supply hopper mounted adjacent each sorting hopper, said supply hopper containing insert cards, and means operable by the opening of one of said sorting hoppers, said means being adapted to supply an insert card to said conveying means beyond the point of removal of said first named card.

7. In a machine of the character described, the combination of conveying means, means for analyzing cards bearing variously positioned holes therein, said cards being carried by said conveying means, sorting hoppers normally closed, said hoppers being adapted to be opened to receive said cards carrying certain holes, an overflow hopper, a sorting device adapted to engage one of said cards and then actuate one of said hoppers to momentarily open the same, depending upon the position of the holes in said card, a supply hopper mounted adjacent each sorting hopper, said supply hopper containing insert cards, and means operable by the opening of one of said sorting hoppers, said means being adapted to supply an insert card to said conveying means beyond the point of removal of said first named card, all of said insert cards and any of said first named cards not received in said sorting hoppers, being received in said overflow hopper.

8. In apparatus of the character described, the combination of a plurality of operating electrical circuits, a movable contact element in each circuit normally closing the same, a series of card receiving hoppers, each actuated to open upon closure of one of said circuits, means for analyzing a card provided with two holes, such holes being adapted to receive two of said contact elements therethrough to actuate two of said hoppers, and means including one of said contact elements, operable upon the reception of said last named element in a third opening in said card in certain relation to one of said first-named openings, said last-named means thereupon preventing operation of said hopper actuated by said first-named element, while permitting actuation of said hopper controlled by the other of said two first-named elements.

Signed by me this 19th day of January, 1929.

HOWARD C. EINSTEIN.